(12) United States Patent
Grant et al.

(10) Patent No.: US 9,916,741 B2
(45) Date of Patent: Mar. 13, 2018

(54) HAPTICALLY ENABLED MESSAGING

(71) Applicant: IMMERSION CORPORATION, San Jose, CA (US)

(72) Inventors: Danny A. Grant, Montreal (CA); Erin B. Ramsay, Dollard-des-Ormeaux (CA); Pedro Gregorio, Verdun (CA); Jason D. Fleming, San Jose, CA (US); Natasha M. Flaherty, Belmont, CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 14/933,675

(22) Filed: Nov. 5, 2015

(65) Prior Publication Data

US 2016/0110969 A1     Apr. 21, 2016

Related U.S. Application Data

(63) Continuation of application No. 13/656,207, filed on Oct. 19, 2012, now Pat. No. 9,197,735, which is a continuation of application No. 11/750,694, filed on May 18, 2007, now Pat. No. 8,315,652.

(51) Int. Cl.
| | |
|---|---|
| *G08B 6/00* | (2006.01) |
| *G06F 1/16* | (2006.01) |
| *G06F 3/01* | (2006.01) |
| *H04M 1/725* | (2006.01) |
| *H04W 4/14* | (2009.01) |
| *H04M 3/42* | (2006.01) |

(52) U.S. Cl.
CPC ............. *G08B 6/00* (2013.01); *G06F 1/1626* (2013.01); *G06F 1/1684* (2013.01); *G06F 3/016* (2013.01); *H04M 1/72552* (2013.01); *H04M 3/42382* (2013.01); *H04W 4/14* (2013.01); *H04M 3/42042* (2013.01); *H04M 2250/22* (2013.01); *H04M 2250/52* (2013.01); *H04M 2250/74* (2013.01)

(58) Field of Classification Search
CPC .................................. G08B 6/00; H04W 4/14
See application file for complete search history.

(56) References Cited

U.S. PATENT DOCUMENTS

| | | | |
|---|---|---|---|
| 6,369,717 B1 * | 4/2002 | Damiani ................ | B60K 35/00 340/815.4 |
| 2005/0143102 A1 * | 6/2005 | McEvilly ................ | H04L 67/34 455/466 |
| 2005/0181827 A1 | 8/2005 | Nieminen-Sundell et al. | |

(Continued)

FOREIGN PATENT DOCUMENTS

| | | |
|---|---|---|
| DE | 202006009826 U1 | 9/2006 |
| JP | 2001251393 A | 9/2001 |
| JP | 2001265703 A | 9/2001 |

(Continued)

*Primary Examiner* — Nathan Mitchell
(74) *Attorney, Agent, or Firm* — Miles & Stockbridge P.C.

(57) ABSTRACT

Method, device, and computer readable medium for generating haptically enabled messages. One disclosed method comprises the steps of receiving a user generated input, mapping the user generated input to a predetermined haptic feedback, assigning a haptic feedback command to the predetermined haptic feedback, inserting the haptic feedback command into a text message, and sending the text message.

20 Claims, 3 Drawing Sheets

(56) References Cited

U.S. PATENT DOCUMENTS

2005/0223071 A1* 10/2005 Hosono ............. H04M 1/72555
709/206
2008/0268882 A1* 10/2008 Moloney ................ H04L 51/18
455/466

FOREIGN PATENT DOCUMENTS

| JP | 2003037653 A | 2/2003 |
|---|---|---|
| JP | 2005142797 A | 6/2005 |
| JP | 2005173674 A | 6/2005 |
| JP | 2006014141 A | 1/2006 |
| JP | 2007004281 A | 1/2007 |
| WO | 02/03172 A | 1/2002 |

\* cited by examiner

HAPTICALLY ENABLED MESSAGING

CROSS-REFERENCE TO RELATED APPLICATIONS

This application is a continuation of U.S. patent application Ser. No. 13/656,207, filed on Oct. 19, 2012, which is a continuation of U.S. patent application Ser. No. 11/750,694, filed on Oct. 19, 2012 and which issued as U.S. Pat. No. 8,315,652 on Nov. 20, 2012. The specifications of both of the foregoing applications are hereby incorporated by reference.

FIELD

One embodiment is directed to electronic messaging. More particularly, one embodiment is directed to haptically enabled electronic messaging for mobile terminal devices.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "mobile terminal devices," such as cellular telephones, personal digital assistants ("PDA"s), smart phones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Many mobile terminal devices, in addition to handling voice telephone calls, allow for messaging between devices. Short Message Service ("SMS"), also known as text messaging, is a popular communication method that enables the exchange of short text messages between mobile terminal devices via the Short Message Service Centre ("SMSC") in a mobile network. Other known messaging methods for mobile terminal devices include Multimedia Messaging Service ("MMS"), Mobile Instant Messaging, and Mobile Email. MMS is a store and forward messaging service that allows mobile subscribers to exchange multimedia messages with other mobile subscribers. As such, it can be seen as an evolution of SMS, with MMS supporting the transmission of additional media types, including text, picture, audio, video, or a combination of all four. Instant Messaging ("IM") is an Internet Protocol ("IP") based application that can provide real-time written communication between users of a computer. Mobile Instant Messaging is the ability to engage in Instant Messaging services from a mobile handset. Mobile IM allows users to address messages to other users using an alias (or user name) and address book, and incorporates the concept of presence, enabling the sender to know when his/her "buddies" are available. Mobile Email is the ability to send and receive e-mail over wireless devices.

Haptic feedback can be used to provide additional information that may not be apparent in the text of the message to the recipient of a message. For example, a text message sent to another user at a mobile terminal device may not include information indicating how strong the user feels about the topic expressed or other message subtext. Users can try to express this subtext using well-known icons or symbols known as "emoticons," which are culturally dependent iconic representations of emotions or messages. For example, a "smiley" emoticon to indicate a humorous message may be expressed as a colon and right parenthesis mark, ":)", which resembles a face smiling when viewed from the side, or may also be expressed as a combination of parenthesis, carets, and an underline "(^_^)". Variations of the smiley emoticon can express a variety of other emotions. However, emoticons and symbols are limited in the complexity of the messages they can convey.

SUMMARY

One embodiment of the present invention is a mobile terminal device that receives a haptically enabled message that includes text and at least one haptic feedback command. The device determines the timing of the haptic feedback command within the message. When the device receives an indication that the message is being displayed by a user, the device synchronizes a haptic effect corresponding to the haptic feedback command. The synchronizing is based on the timing and the indication.

DETAILED DESCRIPTION

One embodiment is a mobile terminal device that can generate and receive haptically enabled messages. When a user reads the message, the haptic content of the message is synchronized with the textual content to enhance the effectiveness of the message.

Haptic feedback embedded in messages, in contrast to emoticons, can offer much more complex and direct ways to express subtext to other users in a more effective manner. Haptic feedback can be used to emphasize information that is contained in the text of the message to the recipient of a message. For example, a text message sent to a user at a mobile terminal device may indicate that gasoline prices are about to rise in their area by a certain amount of money. Haptic feedback embedded in the message can convey to the user the amount of the price differential, enabling the user to understand the meaning of the message without reading the text.

Figure 1:
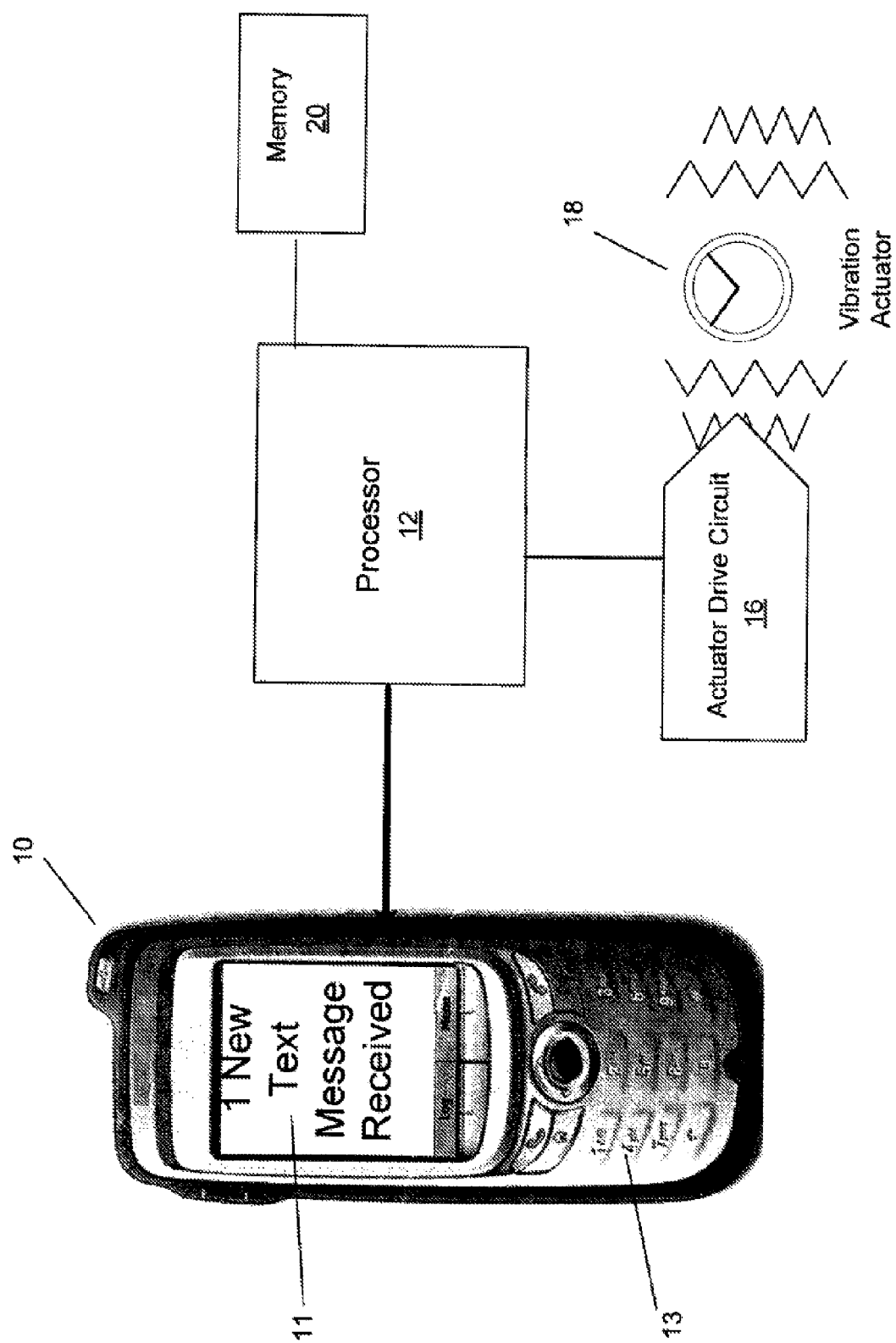
FIG. 1 is a block diagram of a cellular telephone in accordance with one embodiment.

FIG. 1 is a block diagram of a cellular telephone 10 in accordance with one embodiment. Telephone 10 includes a screen 11 and keys 13. In one embodiment, keys 13 are mechanical type keys. In another embodiment, keys 13 can be implemented by a touchscreen so that keys 13 are touchscreen keys, or can be implemented using any method. Internal to telephone 10 is a haptic feedback system that generates vibrations or other types of haptic feedback on telephone 10. In one embodiment, the vibrations are generated on the entire telephone 10. In other embodiments, specific portions of telephone 10 can be haptically enabled by the haptic feedback system, including individual keys of keys 13, whether the keys are mechanically oriented, touchscreen, or some other type of implementation.

The haptic feedback system includes a processor 12. Coupled to processor 12 is a memory 20 and an actuator drive circuit 16, which is coupled to a vibration actuator 18. Although the embodiment of FIG. 1 is a cellular telephone, embodiments of the present invention can be implemented with any type of mobile terminal device, or any device that uses an actuator to generate vibrations or that generates other types of haptic feedback.

Processor 12 may be any type of general purpose controller or processor, or could be a processor specifically designed to provide haptic effects, such as an application-specific integrated circuit ("ASIC"). Processor 12 may be the same controller/processor that operates the entire telephone 10, or may be a separate processor. Processor 12 can decide what haptic effects are to be played and the order in which the effects are played based on high level parameters. In general, the high level parameters that define a particular haptic effect include magnitude, frequency and duration.

Processor 12 outputs the control signals to drive circuit 16 which includes electronic components and circuitry used to supply actuator 18 with the required electrical current and voltage to cause the desired haptic effects. Actuator 18 is a haptic device that generates a vibration on telephone 10. Actuator 18 can include one or more force applying mechanisms which are capable of applying a vibrotactile force to a user of telephone 10 (e.g., via the housing of telephone 10). Actuator 18 may be, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Memory 20 can be any type of storage device, such as random access memory ("RAM") or read-only memory ("ROM"). Memory 20 stores instructions executed by processor 12. Memory 20 may also be located internal to processor 12, or any combination of internal and external memory. In one embodiment, the haptic feedback system may further include an accelerometer (not shown) that measures the acceleration of telephone 10.

Memory 20 further stores instructions that when executed by processor 12 allow a user at telephone 10 to create haptically enabled messages that include haptic content, and to read received haptically enabled messages so that the haptic content is synchronized with the textual content of the messages. In one embodiment, a mobile browser is used to create and read haptically enabled messages.

In one embodiment, a user will create a haptically enabled message on telephone 10 by selecting from a list of icons, commands, codes, emoticon, etc. (collectively, "haptic feedback commands") for designating a haptic feedback. Each haptic feedback may be mapped to specific haptic code that when executed by processor 12 causes the haptic feedback system to generate the specified haptic feedback effect.

For example, a smiley icon, emoticon or command (e.g., :), ☺, (^_^), or <smiley>) can be selected by the user and inserted within the text of an SMS message. The haptic feedback command, when received by the recipient, will create the mapped haptic feedback effect at the user's mobile terminal device. The haptic feedback effect will be related to the type of haptic command. For example, a "pat" effect may generate haptic feedback implementing a small, smooth jolt to the grip or user object of the recipient user's mobile termination device, like a pat of a hand. The "giggle" effect may provide a low-frequency vibration, the "slap" effect may provide a sharp, high magnitude jolt, and the "smile" effect may provide a slow side-to-side motion, etc.

In one embodiment, the user can insert haptic content into the message or pre-assign specific key words, phrases or emoticons with haptic effects. Groups of emoticons can also be tagged and a single haptic effect attached to them. For example, all emoticons associated with "happy" sentiments can be assigned to the same category and have the same haptic effect. In one embodiment, haptic effects can be default assigned to emoticons, key words or phrases. In another embodiment, an invisible command can be inserted in the message so the recipient will not be able to visually anticipate a haptic effect when the message is read.

In one embodiment, telephone 10 allows the user to feel the haptic effect as they are entering the text. In this embodiment, as the user is authoring the message, the haptic feedback can be played back on the device in order for the sender to know what haptic effect is being sent.

Figure 2:
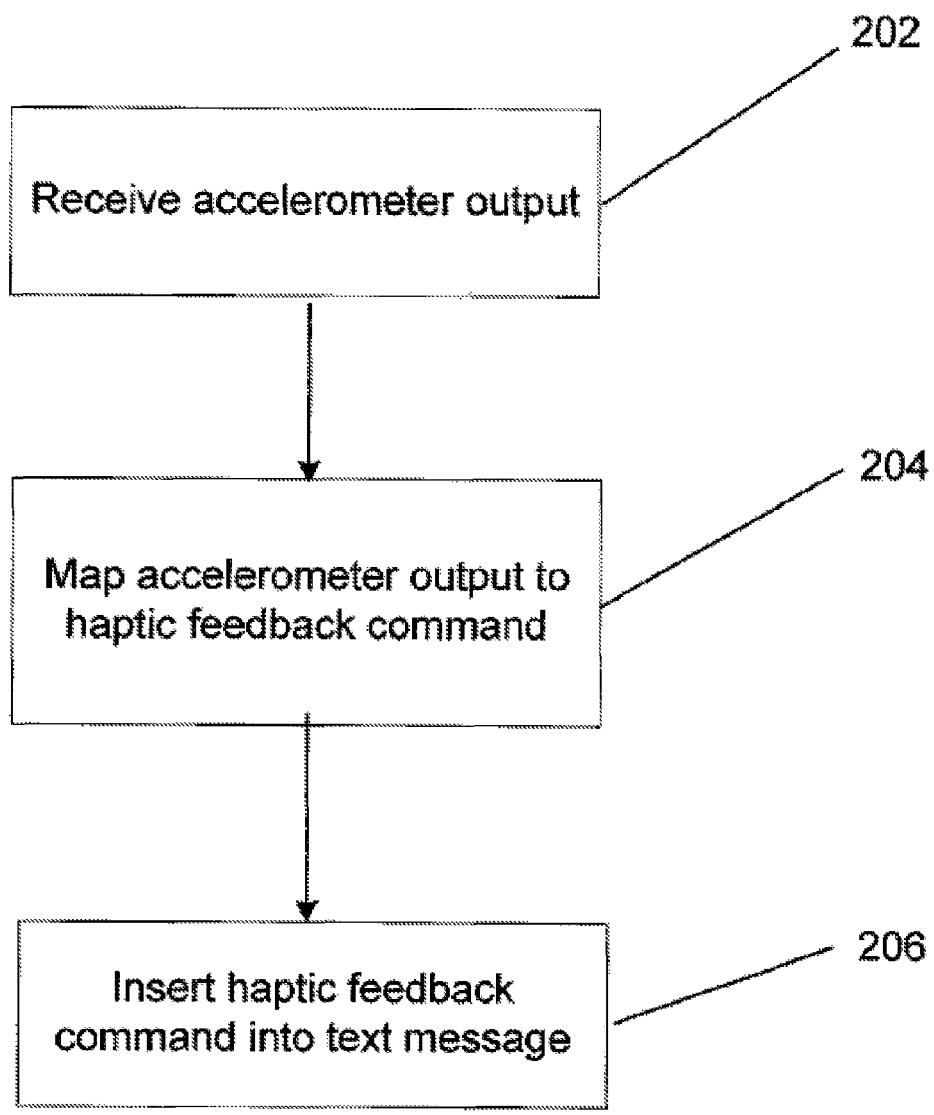
FIG. 2 is a flow diagram of the functionality of a telephone in accordance with one embodiment when gestures are used to create a haptically enabled message.

One embodiment uses gestures to create haptically enabled messages. FIG. 2 is a flow diagram of the functionality of telephone 10 in accordance with one embodiment when gestures are used to create a haptically enabled message. In one embodiment, the functionality of the flow diagram of FIG. 2, and other flow diagrams disclosed below, is implemented by software stored in memory and executed by a processor. In other embodiments, the functionality can be performed by hardware, or any combination of hardware and software.

While inputting text for purposes of creating a message, a user may input a haptic effect through gestures by, for example, moving telephone 10 in a certain fashion that is then mapped to a haptic effect. For example, if the user wishes to express contentment with a message the telephone could be gently rocked back and forth. At 202, the rocking generates an accelerometer output. At 204, processor 12 receives the accelerometer output and maps it to a predetermined haptic effect and corresponding haptic feedback command. For example, the gentle rocking, which would generate relatively low frequency low magnitude accelerations, could be mapped to a smooth low frequency haptic effect. If the user were angry the phone could be shaken up and down with a fast motion, which could be mapped to a haptic effect that is of high intensity and high frequency. At 206, processor 12 inserts the haptic feedback command that corresponds to the haptic effect and inserts it into the text message at the appropriate portion (e.g., at the point of the text message that corresponds to when the user initiated the gesture).

In another embodiment, the haptically enabled message can be generated using voice recognition software. The voice recognition software can tie voice commands to user generated haptic effects. Various aspects of the voice input can be used to map haptic effects such as word commands (e.g., strong, short, short), voice emphasis (e.g., tone of voice) or noises created by the user such as jazz-scat or beat boxing. In another embodiment, gestures can be generated through a video camera input or an input of a user's interface with a touchscreen.

When a user at telephone 10 receives a message, an alert that a new message has been received will typically be displayed to the user on, for example, screen 11. The user will then select the desired message to view. In one embodiment, where the message is a haptically enabled message, there is a need for the playing or initiation of the haptic content to be synchronized or correspond to the textual content of the message.

In another embodiment, haptic content is played when the new message alert is received. The haptic alert can indicate the nature of the content of the message, for example the haptic feedback command contained in the message. Or the haptic alert can identify the message sender or the urgency of the message. In such case the style of the haptic alert may be user configurable.

Figure 3:
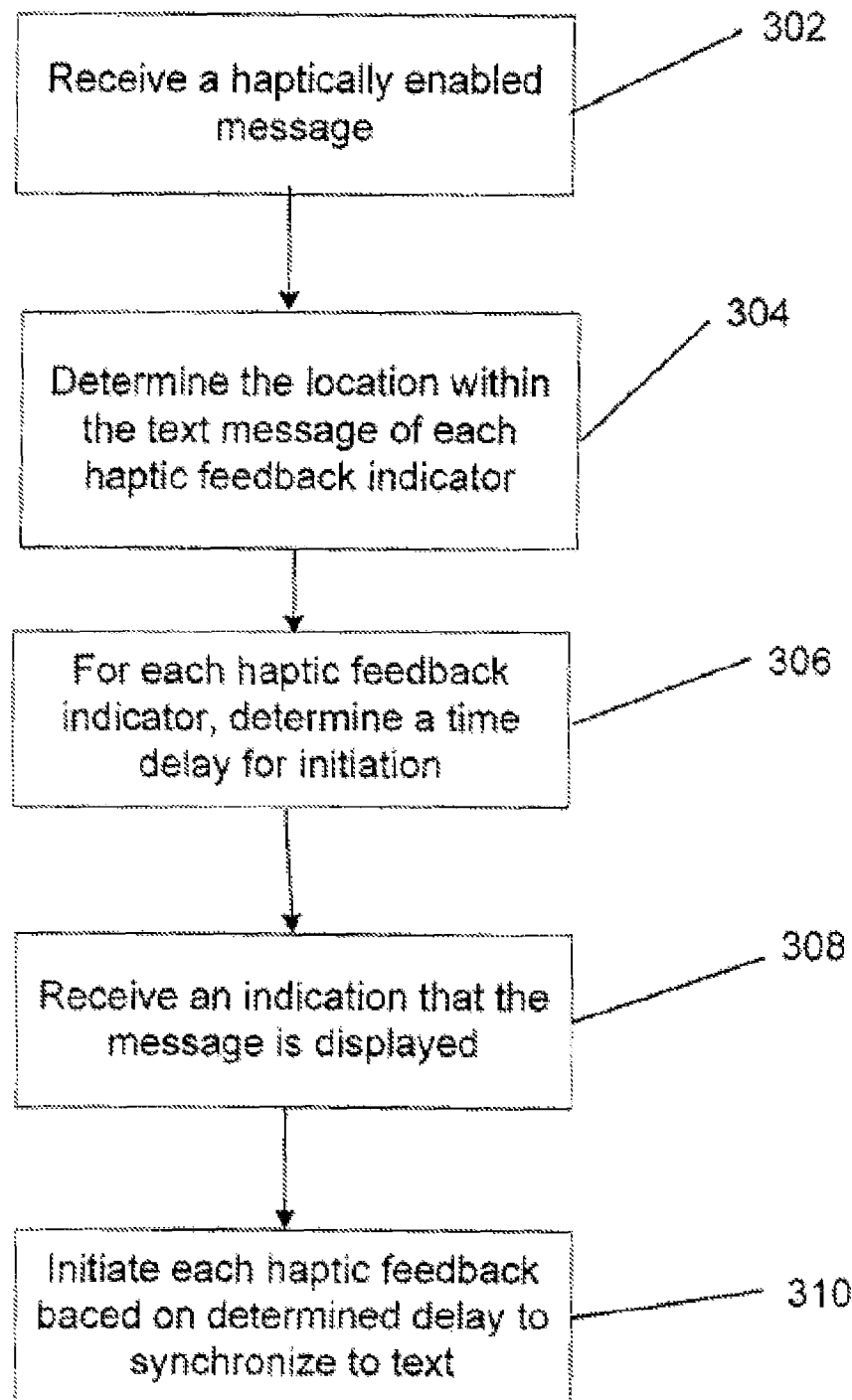
FIG. 3 is a flow diagram of the functionality of a telephone in order to synchronize the haptic content of a haptically enabled message with the textual content in accordance with one embodiment.

FIG. 3 is a flow diagram of the functionality of telephone 10 in order to synchronize the haptic content of a haptically enabled message with the textual content in accordance with one embodiment. At 302, the haptically enabled message is received at telephone 10. In one embodiment, the message may have been initially received without haptic effects and the haptic effects are subsequently inserted in the message. An indication is displayed to the user that a new message is available. At 304, the location of each haptic feedback command within the text message is determined. The location can be based, for example, on the length of the text by word or character count of some other determination.

At 306, for each haptic feedback command and based on the location determined at 304, a time delay for initiating the corresponding haptic effect is determined. The time delay may be a delay from the time that the message is opened by the user.

At 308, when the user opens the message or otherwise accesses the message so it can be read on telephone 10, an indication is received that the message has been opened by the user. At 310, each haptic feedback is initiated based on the determined time delay which is the delay from the time that the message was opened by the user. Therefore, each haptic content is synchronized to the textual content.

For example, the haptically enabled message may include the following:

I went to the store to get ice cream, because I like ice cream ☺, but I was disappointed because they were sold out! ☹

Where the smiley and sad icons are associated with haptic feedback commands. Based on the functionality of FIG. 3, the haptic feedback corresponding to ☺ would first be initiated after an initial pause based on the number of characters or words before the ☺ and then the haptic feedback corresponding to the ☹ would be initiated after an initial pause based on the number of characters or words before the ☹ and after the ☺. In other embodiments, some characters would be given more or less amount of pause time, and some other portions of the message may be given consideration in determining the amount of pause time, such as the amount of spaces or new lines Other embodiments use criteria other than text length and the location of the haptic feedback command within the text in order to synchronize the haptic content with text content. In one embodiment, a determination of when the user or the device is scrolling the text or otherwise advancing the text can be used as a cue for initiating haptic feedback. In another embodiment, an estimate of the user's reading speed can be used to time haptic feedback initiation. A user's reading speed may be measured to obtain this estimate and use that for the timing of the haptic feedback content. For example a user could read one or two test messages and press a button when complete.

In an embodiment where the text includes multimedia content, such as audio and video in an MMS message, the haptic feedback initiation can be coordinated with the timing of the multimedia events.

In a message that includes a high number of haptic feedback commands, one embodiment establishes a precedence order for haptic effects or may even triage effects. For example, if many emoticons were in succession in the text, a decision could be made as to which emoticon would result in haptic effects and which would be ignored.

In one embodiment, haptic effects in haptically enabled messages can be automatically generated when the message is composed. The text of the message can be parsed and the appropriate haptic effect and corresponding haptic feedback command can be automatically inserted. The appropriate haptic effect can be based on, for example, words, phrases, emoticons, punctuation, or the inferred context on the message.

Several embodiments disclosed are specifically illustrated and/or described herein. However, it will be appreciated that modifications and variations are covered by the above teachings and within the purview of the appended claims without departing from the spirit and intended scope of the invention.

For example, some embodiments disclosed above are implemented in a cellular telephone, which is an object that can be grasped, gripped or otherwise physically contacted and manipulated by a user. As such, the present invention can be employed on other haptics enabled input and/or output devices that can be similarly manipulated by the user. Such other devices can include a touch screen (Global Positioning System ("GPS") navigator screen on an automobile, an automated teller machine ("ATM") display screen), a remote for controlling electronics equipment (audio/video, garage door, home security, etc.) and a gaming controller Joystick, mouse, specialized controller, gamepad, etc.). The operation of such input and/or output devices is well known to those skilled in the art. Further, embodiments can be implemented on non-mobile terminal devices that are capable of generating haptic effects that can be sensed by a user.

We claim:

1. A method for generating a haptically enabled message, the method comprising:
   receiving a user generated input comprising text of the message and comprising an emoticon;
   parsing the user generated input;
   mapping the user generated input to a predetermined haptic feedback based on the parsing and corresponding to the emoticon;
   assigning a haptic feedback command to the predetermined haptic feedback, wherein the haptic feedback command is a type that corresponds to the emoticon;
   automatically, after receiving the user generated input and without user intervention, inserting the haptic feedback command into the message; and
   sending the message.

2. The method of claim 1, wherein the user generated input further comprises a gesture on an interface that comprises a touchscreen, further comprising:

mapping the user generated input to a second predetermined haptic feedback, the second predetermined haptic feedback based at least on the gesture; and automatically inserting a second haptic feedback command corresponding to the second predetermined haptic feedback into the message.

3. The method of claim 1, wherein the user generated input is received on a cellular telephone.

4. The method of claim 1, wherein the user generated input is received on a Global Positioning System (GPS) navigator screen on an automobile.

5. The method of claim 1, wherein the user generated input is received on a gaming controller.

6. The method of claim 1, wherein the mapping is further based at least on one of the following of the message: words, phrases, punctuation or an inferred context.

7. The method of claim 2, further comprising outputting the second predetermined haptic feedback when the user generated input is received.

8. A non-transitory computer readable medium having instructions stored thereon that, when executed by a processor, cause the processor to generate a haptically enabled message, the generate comprising:

receiving a user generated input comprising text of the message and comprising an emoticon;

parsing the user generated input;

mapping the user generated input to a predetermined haptic feedback based on the parsing and corresponding to the emoticon;

assigning a haptic feedback command to the predetermined haptic feedback, wherein the haptic feedback command is a type that corresponds to the emoticon;

automatically, after receiving the user generated input and without user intervention, inserting the haptic feedback command into the message; and sending the message.

9. The non-transitory computer readable medium of claim 8, wherein the user generated input further comprises a gesture on an interface that comprises a touchscreen, the generate further comprising:

mapping the user generated input to a second predetermined haptic feedback, the second predetermined haptic feedback based at least on the gesture; and automatically inserting a second haptic feedback command corresponding to the second predetermined haptic feedback into the message.

10. The non-transitory computer readable medium of claim 8, wherein the user generated input is received on a cellular telephone.

11. The non-transitory computer readable medium of claim 8, wherein the user generated input is received on a Global Positioning System (GPS) navigator screen on an automobile.

12. The non-transitory computer readable medium of claim 8, wherein the user generated input is received on a gaming controller.

13. The non-transitory computer readable medium of claim 8, wherein the mapping is further based at least on one of the following of the message: words, phrases, punctuation or an inferred context.

14. The non-transitory computer readable medium of claim 9, the generate further comprising outputting the second predetermined haptic feedback when the user generated input is received.

15. A device comprising:

a processor coupled to a storage device that is configured to:

receive a user generated input comprising text of a message and comprising an emoticon;

parse the user generated input;

map the user generated input to a predetermined haptic feedback based on the parse and corresponding to the emoticon;

assign a haptic feedback command to the predetermined haptic feedback, wherein the haptic feedback command is a type that corresponds to the emoticon;

automatically, after receiving the user generated input and without user intervention, insert the haptic feedback command into the message; and send the message.

16. The device of claim 15, wherein the user generated input further comprises a gesture on an interface that comprises a touchscreen, the processor further configured to:

map the user generated input to a second predetermined haptic feedback, the second predetermined haptic feedback based at least on the gesture; and automatically insert a second haptic feedback command corresponding to the second predetermined haptic feedback into the message.

17. The device of claim 15, wherein the user generated input is received on a cellular telephone.

18. The device of claim 15, wherein the user generated input is received on a Global Positioning System (GPS) navigator screen on an automobile.

19. The device of claim 15, wherein the user generated input is received on a gaming controller.

20. The device of claim 16, further comprising outputting the second predetermined haptic feedback when the user generated input is received.

* * * * *